United States Patent
Kao

(10) Patent No.: US 9,538,862 B2
(45) Date of Patent: Jan. 10, 2017

(54) SLEEVE HANGING BRACKET

(71) Applicant: Jui-Chien Kao, Taichung (TW)

(72) Inventor: Jui-Chien Kao, Taichung (TW)

( * ) Notice: Subject to any disclaimer, the term of this patent is extended or adjusted under 35 U.S.C. 154(b) by 0 days.

(21) Appl. No.: 14/690,196

(22) Filed: Apr. 17, 2015

(65) Prior Publication Data

US 2016/0302592 A1    Oct. 20, 2016

(51) Int. Cl.
*A47F 5/08* (2006.01)
*F16M 13/02* (2006.01)
*A47F 7/00* (2006.01)

(52) U.S. Cl.
CPC . *A47F 5/08* (2013.01); *A47F 7/00* (2013.01); *F16M 13/02* (2013.01)

(58) Field of Classification Search
CPC .... A47F 5/0807; A47F 5/0846; A47F 5/0006; A47F 7/0028; A47F 5/08; A47F 7/00; B62H 3/04; B62H 3/003; B62H 3/06; B25B 13/56; B25B 13/06; F16M 13/02
USPC ........................................................ 211/70.6
See application file for complete search history.

(56) References Cited

U.S. PATENT DOCUMENTS

| | | | | |
|---|---|---|---|---|
| 4,826,021 A * | 5/1989 | Burrell | ................... | B25H 3/003 211/70.6 |
| 5,228,570 A * | 7/1993 | Robinson | ................. | B25H 3/06 206/375 |
| 6,431,373 B1 * | 8/2002 | Blick | .................... | B25H 3/003 206/378 |
| 8,479,929 B1 * | 7/2013 | Kao | ......................... | B25H 3/04 211/69 |
| 8,517,188 B2 * | 8/2013 | Kao | ......................... | B25H 3/06 211/70.6 |
| 8,733,561 B2 * | 5/2014 | Kao | ......................... | B25H 3/04 206/378 |
| 8,733,562 B2 * | 5/2014 | Kao | ....................... | A47B 81/00 206/378 |
| 8,813,957 B1 * | 8/2014 | Kao | ....................... | B25H 3/003 206/378 |
| 9,126,329 B2 * | 9/2015 | Kao | ........................ | B25H 3/04 |
| 9,186,790 B1 * | 11/2015 | Kao | ....................... | B25H 3/003 |
| 2010/0001159 A1 * | 1/2010 | Kao | ......................... | B25H 3/04 248/316.4 |
| 2010/0065520 A1 * | 3/2010 | Hsieh | ...................... | B25H 3/06 211/70.6 |
| 2012/0138553 A1 * | 6/2012 | Kao | ......................... | B25H 3/06 211/70.6 |
| 2013/0062480 A1 * | 3/2013 | Kao | ......................... | B25H 3/04 248/201 |

(Continued)

*Primary Examiner* — Patrick Hawn
(74) *Attorney, Agent, or Firm* — AEON Law; Adam L. K. Philipp

(57) ABSTRACT

A sleeve hanging bracket has a track base and at least one positioning mount. The track base has a bottom panel, a slide rail, and a mounting recess. The slide rail is formed on and protrudes from a top surface of the bottom panel and has an upper opening and a sliding recess. The mounting recess is formed in a middle of a top surface of the bottom panel to form a stepped face between a bottom face of the mounting recess and the top surface of the bottom panel. The at least one positioning mount is movably and rotatably mounted on the track base and has a sliding seat and an inserting button. The sliding seat is movably mounted in the sliding recess above the mounting recess. The inserting button is formed on and protrudes from the sliding seat and extends out of the upper opening.

20 Claims, 6 Drawing Sheets

(56) References Cited

U.S. PATENT DOCUMENTS

| | | | | |
|---|---|---|---|---|
| 2013/0306581 A1* | 11/2013 | Kao | ........................ | A47B 81/00 |
| | | | | 211/49.1 |
| 2015/0034518 A1* | 2/2015 | Kao | ......................... | B65D 1/36 |
| | | | | 206/372 |

* cited by examiner

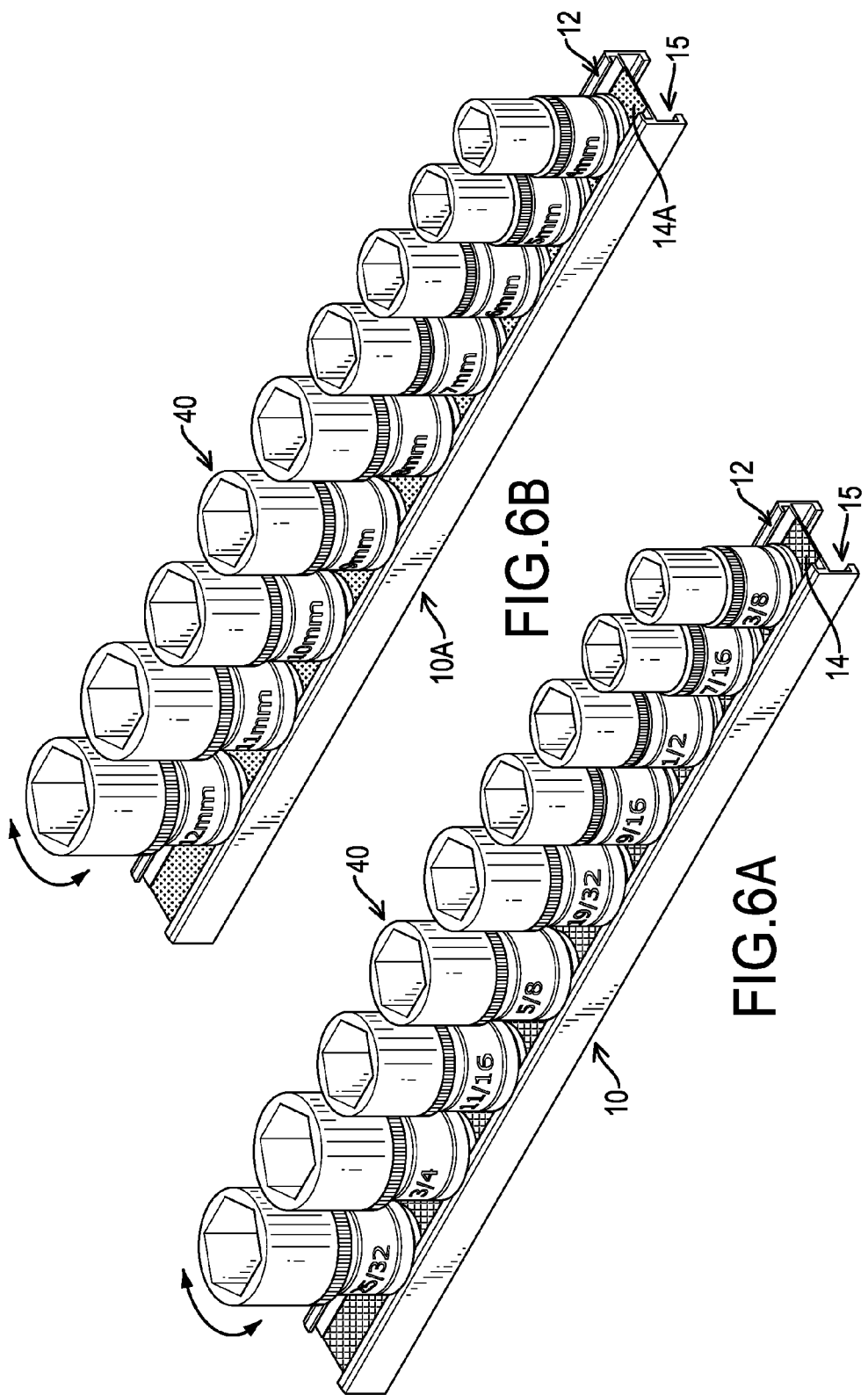

SLEEVE HANGING BRACKET

BACKGROUND OF THE INVENTION

1. Field of the Invention

The present invention relates to a sleeve hanging bracket, and more particularly to a sleeve hanging bracket that can reduce frictions for positioning mounts of the sleeve hanging bracket to move smoothly and can facilitate user's easy identification of the sleeve' specifications.

2. Description of Related Art

A conventional sleeve hanging bracket has a track base and multiple positioning mounts. The track base has a top and a slide rail. The slide rail is formed in the top of the track base and has a bottom surface. The positioning mounts are movably mounted in the slide rail of the track base. Each one of the positioning mounts has a sliding seat and an inserting button. The sliding seat is movably mounted in the slide rail of the track base and has a top surface. The inserting button is formed on and protrudes upwardly from the top surface of the sliding seat and extends out of the slide rail. In use, sleeves of different sizes are mounted around the inserting buttons of the positioning mounts to be stored on the conventional sleeve hanging bracket.

However, the bottom surface of the slide rail completely abuts the sliding seats of the positioning mounts and this will increase the frictions when the positioning mounts are moved relative to the slide rail. Then, the moving smoothness of the positioning mounts will be reduced by the frictions between the slide rail and the positioning mounts. In addition, the frictions between the slide rail and the positioning mounts will increase wear of the positioning mounts and this will increase the cost of using the conventional sleeve hanging bracket.

Furthermore, besides different sizes, the sleeves further have different specifications such as inch and metric measurement units. Although a user can identify the sizes of the sleeves by the marked numbers or scales on the sleeves to store the sleeves of different sizes on the conventional hanging bracket according to the sizes of sleeves sequentially, the user cannot identify the specifications of the sleeves on the conventional sleeve hanging bracket directly according to appearance of the conventional sleeve hanging bracket. Then, the user needs to further observe the sleeves to confirm the specifications of the sleeves and this is inconvenient in use.

To overcome the shortcomings, the present invention tends to provide a sleeve hanging bracket to mitigate the aforementioned problems.

SUMMARY OF THE INVENTION

The main objective of the invention is to provide a sleeve hanging bracket that can reduce frictions for positioning mounts of the sleeve hanging bracket to move smoothly and can facilitate user's quick identification of the sleeve's specifications.

A sleeve hanging bracket in accordance with the present invention has a track base and at least one positioning mount. The track base has a bottom panel, a slide rail, and a mounting recess. The slide rail is formed on and protrudes from a top surface of the bottom panel and has an upper opening and a sliding recess. The mounting recess is formed in a middle of the top surface of the bottom panel to form a stepped face between a bottom face of the mounting recess and the top surface of the bottom panel. The at least one positioning mount is movably and rotatably mounted on the track base and has a sliding seat and an inserting button. The sliding seat is movably mounted in the sliding recess above the mounting recess. The inserting button is formed on and protrudes from the sliding seat and extends out of the upper opening Other objects, advantages and novel features of the invention will become more apparent from the following detailed description when taken in conjunction with the accompanying drawings.

BRIEF DESCRIPTION OF THE DRAWINGS

FIGS. 6A and 6B are operational perspective views of the first and second embodiments of the sleeve hanging brackets in FIGS. 1 and 5.

DETAILED DESCRIPTION OF PREFERRED EMBODIMENT

Figure 1:
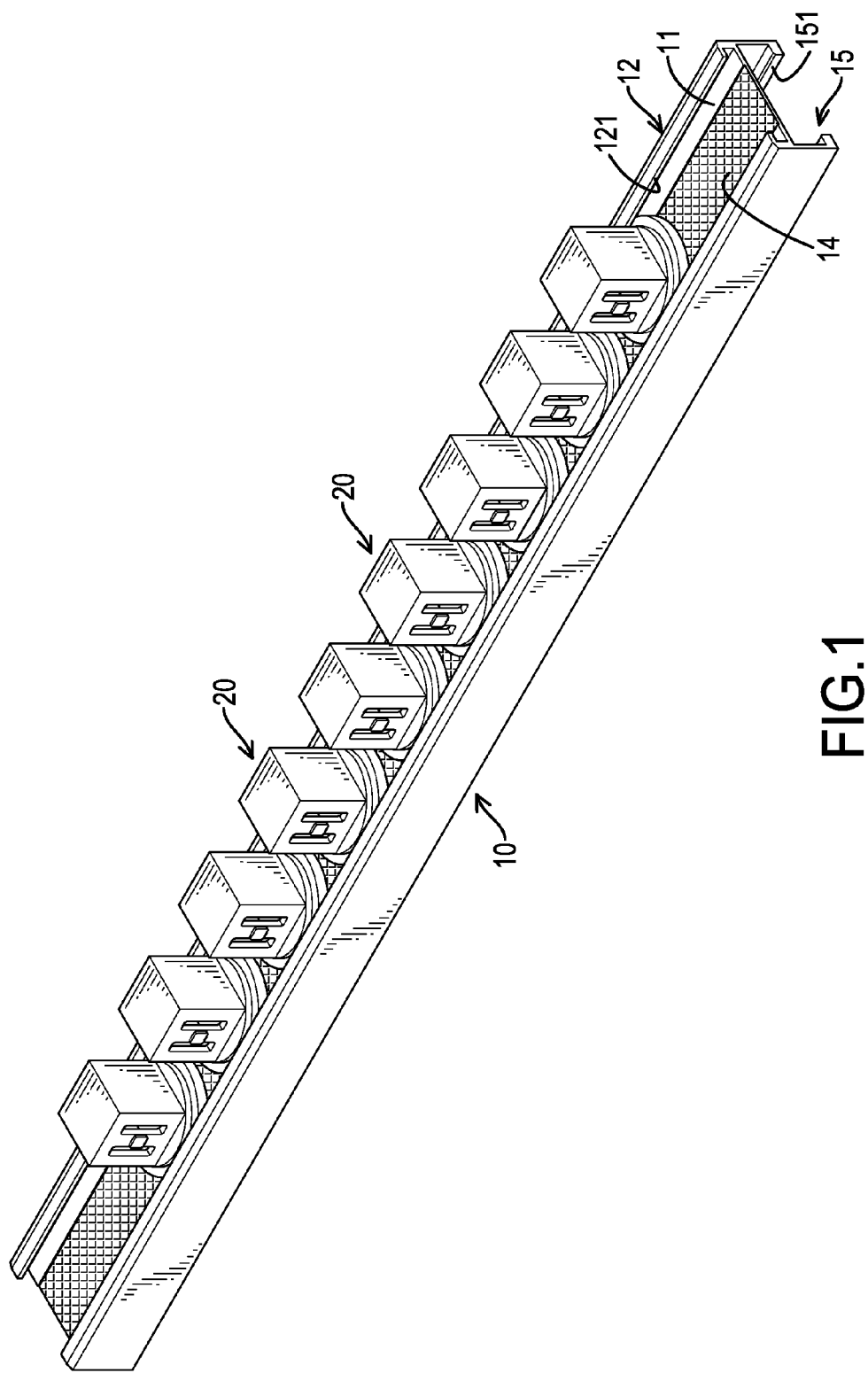
FIG. 1 is a perspective view of a first embodiment of a sleeve hanging bracket in accordance with the present invention.
Figure 2:
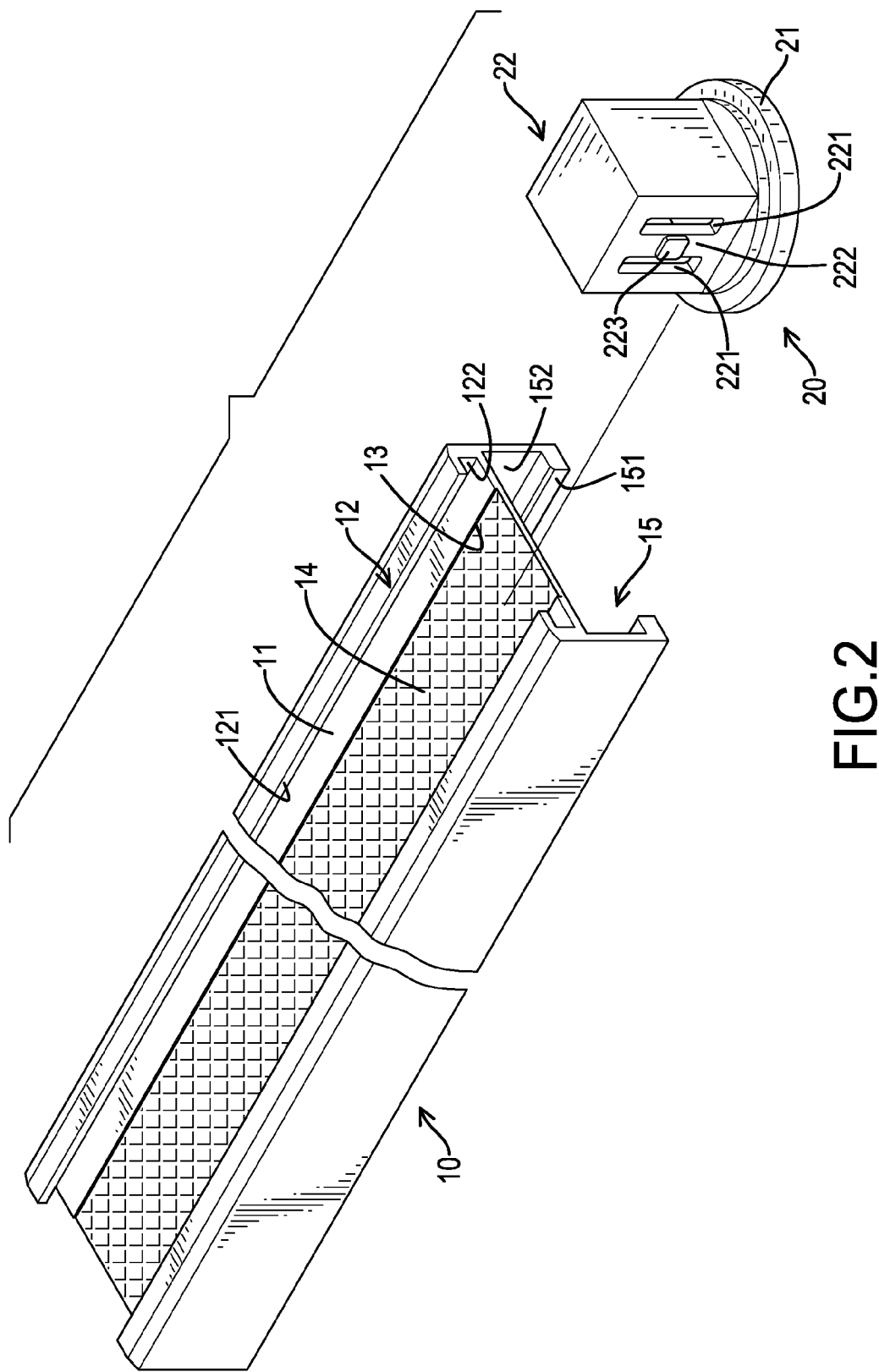
FIG. 2 is a partially enlarged and exploded perspective view of the sleeve hanging bracket in FIG. 1.
Figure 3:
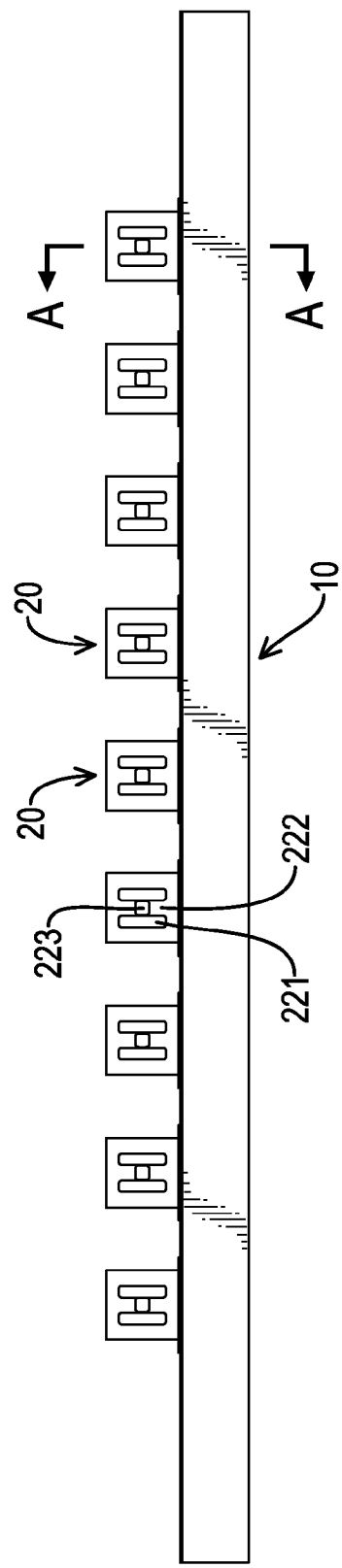
FIG. 3 is a side view of the sleeve hanging bracket in FIG. 1.

With reference to FIGS. 1 to 4, a first embodiment of a sleeve hanging bracket in accordance with the present invention comprises a track base 10 and at least one positioning mount 20.

The track base 10 is made of aluminum and has a bottom panel 11, a slide rail 12, a mounting recess 13, an identification layer 14, and a closed track 15.

The bottom panel 11 is elongated and has a top surface, a bottom surface, and two opposite long sides. The slide rail 12 is formed on and protrudes from the top surface of the bottom panel 11 along the opposite long sides of the bottom panel 11. The slide rail 12 has a top, an upper opening 121, and a sliding recess 122. The upper opening 121 is formed through the top of the slide rail 12 and has a width W1. The sliding recess 122 is formed in the slide rail 12 between the top of the slide rail 12 and the top surface of the bottom panel 11 and communicates with the upper opening 121.

The mounting recess 13 is formed in a middle of the top surface of the bottom panel 11 along the opposite long sides of the bottom panel 11 to form a stepped face between a bottom face of the mounting recess 13 and the top surface of the bottom panel 11. The mounting recess 13 communicates with the sliding recess 122 of the slide rail 12. The identification layer 14 is mounted on the bottom face of the mounting recess 13 by coating or attaching and has a different color or pattern relative to the top surface of the bottom panel 11. Preferably, the identification layer 14 is used to represent the track base 10 for metric specification of sleeves.

The closed track 15 is formed on and protrudes downwardly from the bottom surface of the bottom panel 11 along the opposite long sides of the bottom panel 11 and has a bottom, a lower opening 151, and a through slot 152. Preferably, the closed track 15 and the slide rail 12 are formed on the bottom panel 11 as a single piece. The lower opening 151 is formed through the bottom of the closed track 15 and has a width W2. Preferably, the width W2 of the lower opening 151 is wider than the width W1 of the upper opening 121 (W2>W1). The through slot 152 is formed in the closed track 15 between the bottom surface of the bottom panel 11 and the bottom of the closed track 15 and communicates with the lower opening 151.

The at least one positioning mount 20 is movably and rotatably mounted on the track base 10, and each one of the at least one positioning mount 20 has a sliding seat 21 and an inserting button 22. The sliding seat 21 is round, is movably mounted in the sliding recess 122 of the slide rail 12 above the mounting recess 13, and has a top surface and a bottom surface. The bottom surface of the sliding seat 21 abuts the top surface of the bottom panel 11 beside the mounting recess 13 and faces the identification layer 14.

The inserting button 22 is a hollow, is formed on and protrudes upwardly from the top surface of the sliding seat 21 and extends out of the upper opening 121 of the slide rail 12. The inserting button 22 is rectangular and has a side surface, two slits 221, a resilient section 222, and a protruding segment 223. The slits 221 are formed through the side surface of the inserting button 22 and are parallel with each other. The resilient section 222 is formed on the side surface of the inserting button 22 between the slits 221 such that the resilient section 222 is deformable relative to the side surface of the inserting button 22, and the resilient section 222 has a central segment. The protruding segment 223 is formed on and protrudes outwardly from the central segment of the resilient section 222. Preferably, the sleeve hanging bracket has multiple positioning mounts 20 mounted on the track base 10.

Figure 5:
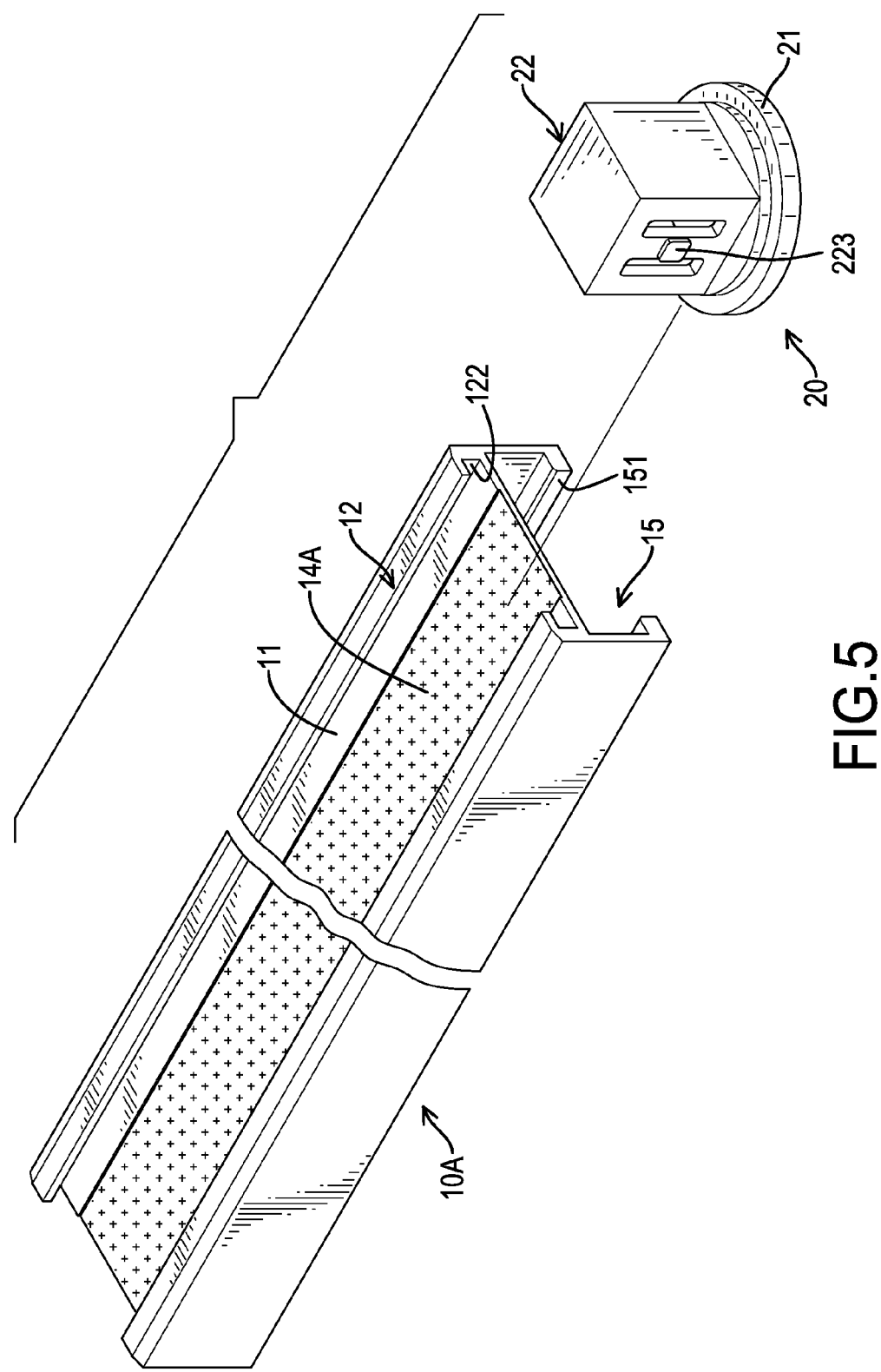
FIG. 5 is a partially enlarged and exploded perspective view of a second embodiment of a sleeve hanging bracket in accordance with the present invention.

With reference to FIG. 5, a second embodiment of a sleeve hanging bracket in accordance with the present invention is substantially the same as the first embodiment except for the following features. The identification layer 14A of the track base 10A of the second embodiment of the sleeve hanging bracket has a color or pattern different from the color or the pattern of the identification layer 14 of the track base 10 of the first embodiment of the sleeve hanging bracket. Preferably, the identification layer 14A is used to represent the track base 10A for inch specification of sleeves.

With reference to FIGS. 6A and 6B, in use, sleeves 40 are respectively and detachably mounted around the inserting buttons 22 of the positioning mounts 20 of the two embodiments of the sleeve hanging brackets. When each sleeve 40 is mounted around the inserting button 22 of a corresponding positioning mount 20, the resilient section 222 of the inserting button 22 is bent inwardly by an inner surface of the sleeve 40. Consequently, the resilient section 222 recovers and the protruding segment 223 is embedded in a recess of the inner surface of the sleeve 40 to position the sleeve 40.

If a number or a sign on the sleeve 40 is not faced toward a user, the user can rotate the sleeve 40 relative to the track base 10, 10A in a clockwise direction or a counterclockwise direction according to the position of the number or sign on the sleeve 40. Since the sleeve 40 is securely mounted around the inserting button 22 of the positioning mount 20 and the sliding seat 21 is round, the sliding seat 21 is rotated with the inserting button 22 and the sleeve 40 relative to the track base 10 to enable the number or sign on the sleeve 40 to face the user.

In addition, the user also can use the identification layers 14, 14A with different colors or patterns of the track bases 10, 10A to identify the specifications of the sleeves 41 that are mounted on the track bases 10, 10A clearly and easily. Then, the metric or inch specifications of the sleeves 40 on the track bases 10, 10A can be identified easily according to the colors or patterns of the identification layers 14, 14A, and this is convenient in use.

Figure 4:
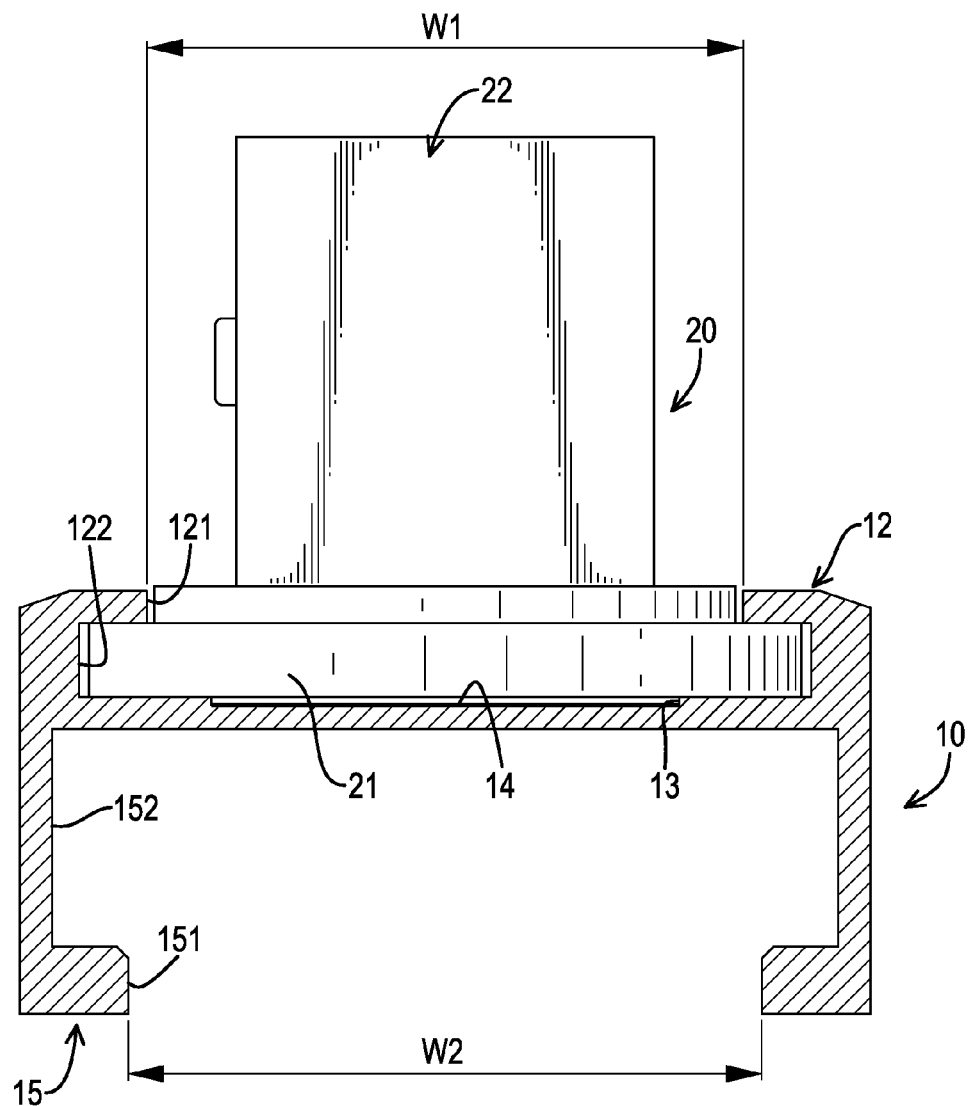
FIG. 4 is an enlarged side view in partial section of the sleeve hanging bracket along line A-A in FIG. 3.

Furthermore, with reference to FIG. 4, the mounting recess 13 is formed in the middle of the top surface of the bottom panel 11 of the track base 10, and the bottom surface of the sliding seat 21 of each one of the at least one positioning mount 20 does not completely abut the top surface of the bottom panel 11. Then, the friction between the at least one positioning mount 20 and the track base 10 can be reduced when the at least one positioning mount 20 is moved relative to the track base 10. Then, the moving smoothness of the at least one positioning mount 20 will be improved by reducing the friction between the bottom panel 11 and the sliding seat 21. In addition, wear of the at least one positioning mount 20 also can be reduced and this will lower the cost of using the sleeve hanging bracket.

Even though numerous characteristics and advantages of the present invention have been set forth in the foregoing description, together with details of the structure and features of the invention, the disclosure is illustrative only. Changes may be made in the details, especially in matters of shape, size, and arrangement of parts within the principles of the invention to the full extent indicated by the broad general meaning of the terms in which the appended claims are expressed.

What is claimed is:

1. A sleeve hanging bracket comprising:
   a track base having
      a bottom panel having a top surface, a bottom surface, and two opposite long sides;
      a slide rail formed on and protruding from the top surface of the bottom panel along the opposite long sides of the bottom panel, and having
         a top;
         an upper opening formed through the top of the slide rail; and
         a sliding recess formed in the slide rail between the top of the slide rail and the top surface of the bottom panel and communicating with the upper opening; and
      a mounting recess formed in a middle of the top surface of the bottom panel along the opposite long sides of the bottom panel to form a stepped face between a bottom face of the mounting recess and the top surface of the bottom panel and communicating with the sliding recess of the slide rail; and
   at least one positioning mount movably mounted on the track base, and each one of the at least one positioning mount having
      a sliding seat movably mounted in the sliding recess of the slide rail above the mounting recess, and having
         a bottom surface abutting the top surface of the bottom panel beside the mounting recess; and
         a top surface; and
      an inserting button formed on and protruding upwardly from the top surface of the sliding seat and extending out of the upper opening of the slide rail.

2. A sleeve hanging bracket comprising:
   a track base having
      a bottom panel having a top surface, a bottom surface, and two opposite long sides;
      a slide rail formed on and protruding from the top surface of the bottom panel along the opposite long sides of the bottom panel, and having
         a top;

an upper opening formed through the top of the slide rail; and a sliding recess formed in the slide rail between the top of the slide rail and the top surface of the bottom panel and communicating with the upper opening;

a mounting recess formed in a middle of the top surface of the bottom panel along the opposite long sides of the bottom panel to form a stepped face between a bottom face of the mounting recess and the top surface of the bottom panel, and communicating with the sliding recess of the slide rail; and an identification layer mounted on the bottom face of the mounting recess; and at least one positioning mount movably mounted on the track base, and each one of the at least one positioning mount having a sliding seat movably mounted in the sliding recess of the slide rail above the mounting recess, and having a bottom surface abutting the top surface of the bottom panel beside the mounting recess and facing the identification layer; and a top surface; and an inserting button formed on and protruding upwardly from the top surface of the sliding seat and extending out of the upper opening of the slide rail.

3. The sleeve hanging bracket as claimed in claim 2, wherein the identification layer has a color different from a color of the top surface of the bottom panel.

4. The sleeve hanging bracket as claimed in claim 2, wherein the identification layer has a pattern different from a pattern of the top surface of the bottom panel.

5. The sleeve hanging bracket as claimed in claim 1, wherein the track base has a closed track formed on and protruding downwardly from the bottom surface of the bottom panel along the opposite long sides of the bottom panel, and the closed track has a bottom;

a lower opening formed through the bottom of the closed track; and a through slot formed in the closed track between the bottom surface of the bottom panel and the bottom of the closed track and communicating with the lower opening.

6. The sleeve hanging bracket as claimed in claim 2, wherein the track base has a closed track formed on and protruding downwardly from the bottom surface of the bottom panel along the opposite long sides of the bottom panel, and the closed track has a bottom;

a lower opening formed through the bottom of the closed track; and a through slot formed in the closed track between the bottom surface of the bottom panel and the bottom of the closed track and communicating with the lower opening.

7. The sleeve hanging bracket as claimed in claim 3, wherein the track base has a closed track formed on and protruding downwardly from the bottom surface of the bottom panel along the opposite long sides of the bottom panel, and the closed track has a bottom;

a lower opening formed through the bottom of the closed track; and a through slot formed in the closed track between the bottom surface of the bottom panel and the bottom of the closed track and communicating with the lower opening.

8. The sleeve hanging bracket as claimed in claim 4, wherein the track base has a closed track formed on and protruding downwardly from the bottom surface of the bottom panel along the opposite long sides of the bottom panel, and the closed track has a bottom;

a lower opening formed through the bottom of the closed track; and a through slot formed in the closed track between the bottom surface of the bottom panel and the bottom of the closed track and communicating with the lower opening.

9. The sleeve hanging bracket as claimed in claim 5, wherein the lower opening has a width wider than a width of the upper opening.

10. The sleeve hanging bracket as claimed in claim 6, wherein the lower opening has a width wider than a width of the upper opening.

11. The sleeve hanging bracket as claimed in claim 9, wherein the sliding seat of each one of the at least one positioning mount is round, and each one of the at least one positioning mount is rotatably mounted on the track base.

12. The sleeve hanging bracket as claimed in claim 10, wherein the sliding seat of each one of the at least one positioning mount is round, and each one of the at least one positioning mount is rotatably mounted on the track base.

13. The sleeve hanging bracket as claimed in claim 11, wherein the inserting button of each one of the at least one positioning mount is hollow and rectangular, and has a side surface;

two slits formed through the side surface of the inserting button and parallel with each other;

a resilient section formed on the side surface of the inserting button between the slits, being deformable relative to the side surface of the inserting button, and having a central segment; and a protruding segment formed on and protruding outwardly from the central segment of the resilient section.

14. The sleeve hanging bracket as claimed in claim 12, wherein the inserting button of each one of the at least one positioning mount is hollow and rectangular, and has a side surface;

two slits formed through the side surface of the inserting button and parallel with each other;

a resilient section formed on the side surface of the inserting button between the slits, being deformable relative to the side surface of the inserting button, and having a central segment; and a protruding segment formed on and protruding outwardly from the central segment of the resilient section.

15. The sleeve hanging bracket as claimed in claim 1, wherein the sliding seat of each one of the at least one positioning mount is round, and each one of the at least one positioning mount is rotatably mounted on the track base.

16. The sleeve hanging bracket as claimed in claim 2, wherein the sliding seat of each one of the at least one positioning mount is round, and each one of the at least one positioning mount is rotatably mounted on the track base.

17. The sleeve hanging bracket as claimed in claim 3, wherein the sliding seat of each one of the at least one positioning mount is round, and each one of the at least one positioning mount is rotatably mounted on the track base.

18. The sleeve hanging bracket as claimed in claim 4, wherein the sliding seat of each one of the at least one positioning mount is round, and each one of the at least one positioning mount is rotatably mounted on the track base.

19. The sleeve hanging bracket as claimed in claim 1, wherein the inserting button of each one of the at least one positioning mount is hollow and rectangular, and has
- a side surface;
- two slits formed through the side surface of the inserting button and parallel with each other;
- a resilient section formed on the side surface of the inserting button between the slits, being deformable relative to the side surface of the inserting button, and having a central segment; and
- a protruding segment formed on and protruding outwardly from the central segment of the resilient section.

20. The sleeve hanging bracket as claimed in claim 2, wherein the inserting button of each one of the at least one positioning mount is hollow and rectangular, and has
- a side surface;
- two slits formed through the side surface of the inserting button and parallel with each other;
- a resilient section formed on the side surface of the inserting button between the slits, being deformable relative to the side surface of the inserting button, and having a central segment; and
- a protruding segment formed on and protruding outwardly from the central segment of the resilient section.

* * * * *